United States Patent
Ng

(10) Patent No.: US 11,845,545 B2
(45) Date of Patent: Dec. 19, 2023

(54) SELF-PROPELLED PAYLOADS FOR AIRCRAFT

(71) Applicant: Nact Engineering Pte. Ltd., Singapore (SG)

(72) Inventor: Aik Thong Ng, Singapore (SG)

(73) Assignee: Nact Engineering Pte. Ltd, Singapore (SG)

( * ) Notice: Subject to any disclaimer, the term of this patent is extended or adjusted under 35 U.S.C. 154(b) by 263 days.

(21) Appl. No.: 17/294,422

(22) PCT Filed: Nov. 16, 2019

(86) PCT No.: PCT/SG2019/050562
§ 371 (c)(1),
(2) Date: May 17, 2021

(87) PCT Pub. No.: WO2020/101577
PCT Pub. Date: May 22, 2020

(65) Prior Publication Data
US 2021/0394903 A1    Dec. 23, 2021

Related U.S. Application Data

(60) Provisional application No. 62/768,120, filed on Nov. 16, 2018.

(51) Int. Cl.
| | |
|---|---|
| *B64C 39/02* | (2023.01) |
| *B64C 17/02* | (2006.01) |
| *B64D 9/00* | (2006.01) |
| *B64U 10/13* | (2023.01) |

(52) U.S. Cl.
CPC ............ *B64C 39/024* (2013.01); *B64C 17/02* (2013.01); *B64D 9/00* (2013.01); *B64U 10/13* (2023.01); *B64U 2201/20* (2023.01)

(58) Field of Classification Search
CPC ....... B64C 17/02; B64C 37/02; B64C 39/022; B64C 2211/00; B64D 9/00
See application file for complete search history.

(56) References Cited

U.S. PATENT DOCUMENTS

| | | | |
|---|---|---|---|
| 4,695,012 A | 9/1987 | Lindenbaum | |
| 2009/0294573 A1* | 12/2009 | Wilson | B64C 39/024 |
| | | | 703/7 |
| 2013/0037650 A1* | 2/2013 | Heppe | B64C 37/02 |
| | | | 244/2 |
| 2016/0185459 A1* | 6/2016 | Kiefer | B64C 39/024 |
| | | | 244/54 |
| 2018/0118336 A1* | 5/2018 | Drennan | B64C 37/02 |
| 2019/0276140 A1* | 9/2019 | Poltorak | B64C 39/024 |

FOREIGN PATENT DOCUMENTS

| | | |
|---|---|---|
| CN | 106364673 A | 2/2017 |
| FR | 2937306 A1 | 4/2010 |
| WO | 2018071592 A2 | 4/2018 |

* cited by examiner

*Primary Examiner* — Richard G Davis
(74) *Attorney, Agent, or Firm* — HORIZON IP PTE LTD.

(57) ABSTRACT

A self-propelled payload (SPP) for an aircraft, such as an unmanned aircraft. The SPP includes an independent propulsion unit which is configured to counter the effect of payloads of the aircraft. This improves operational effectiveness of the aircraft.

20 Claims, 23 Drawing Sheets

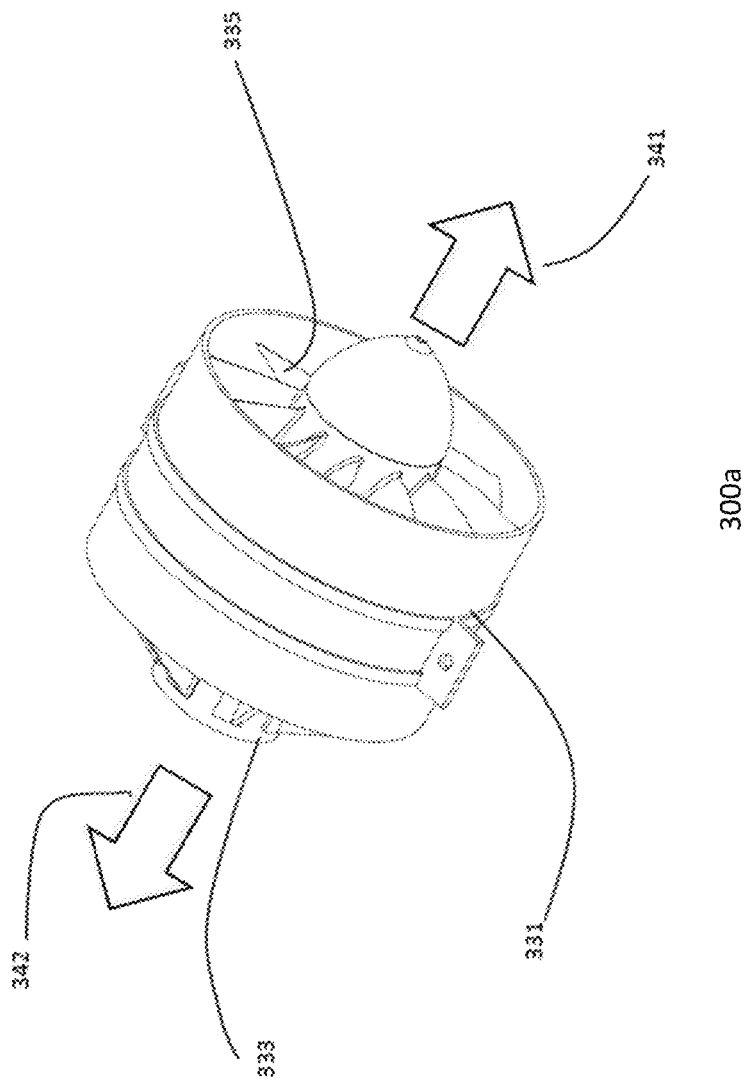

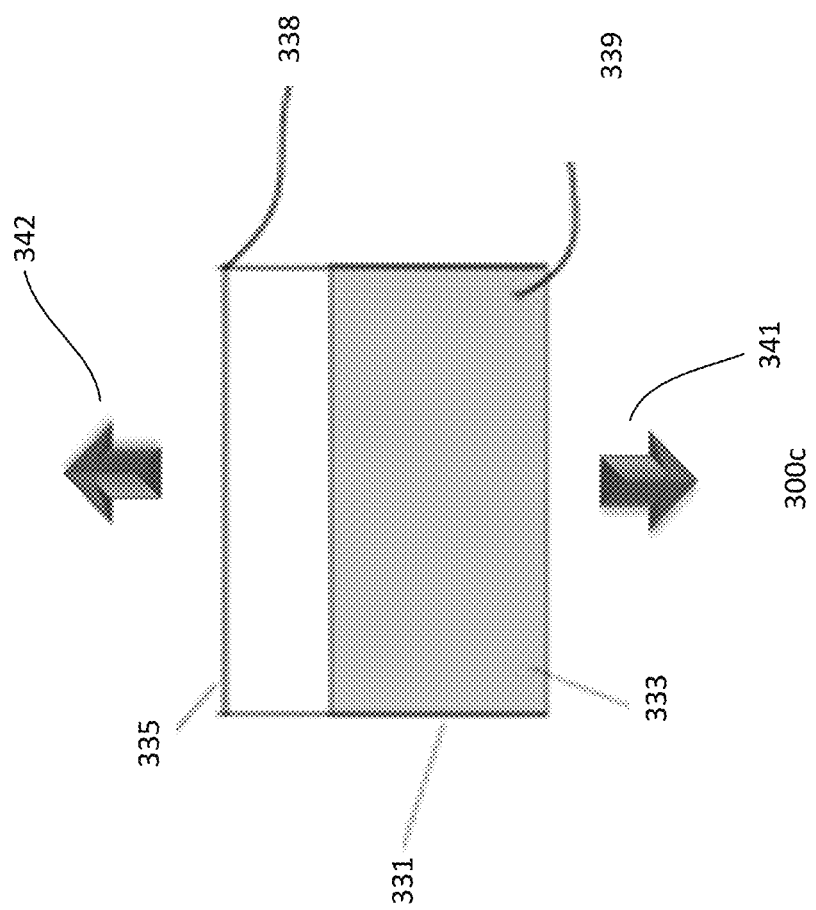

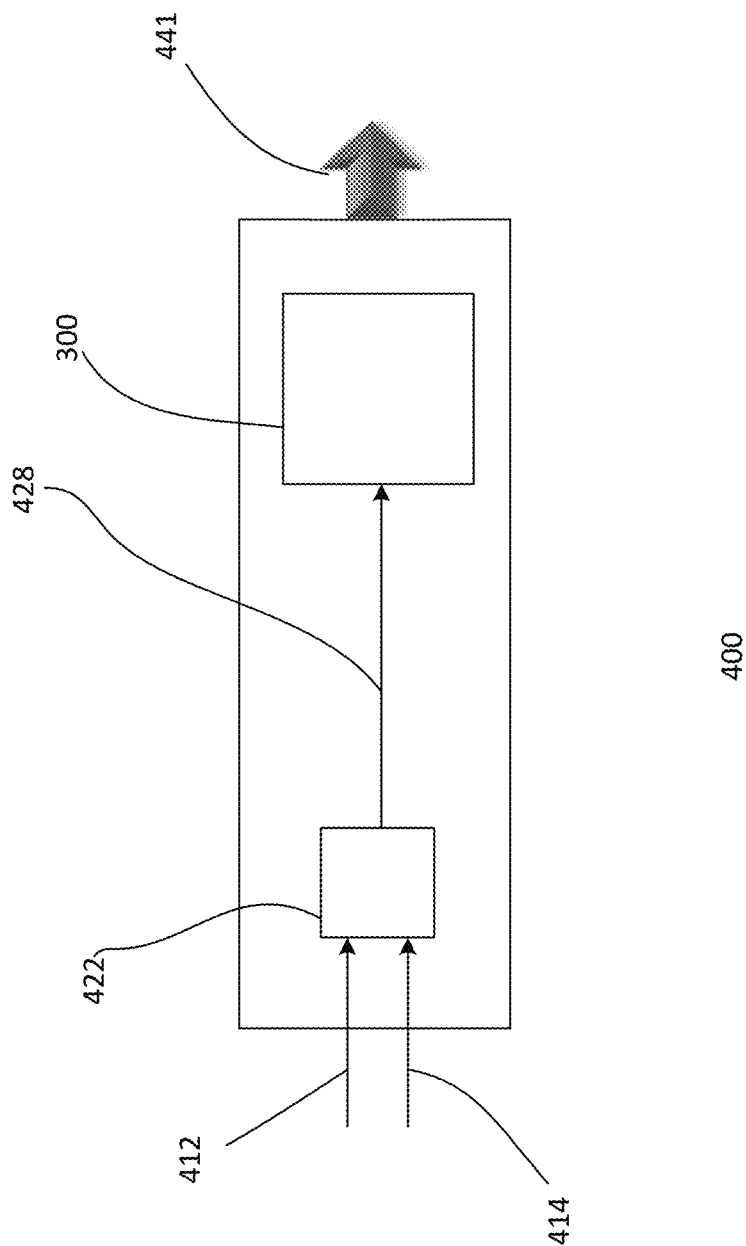

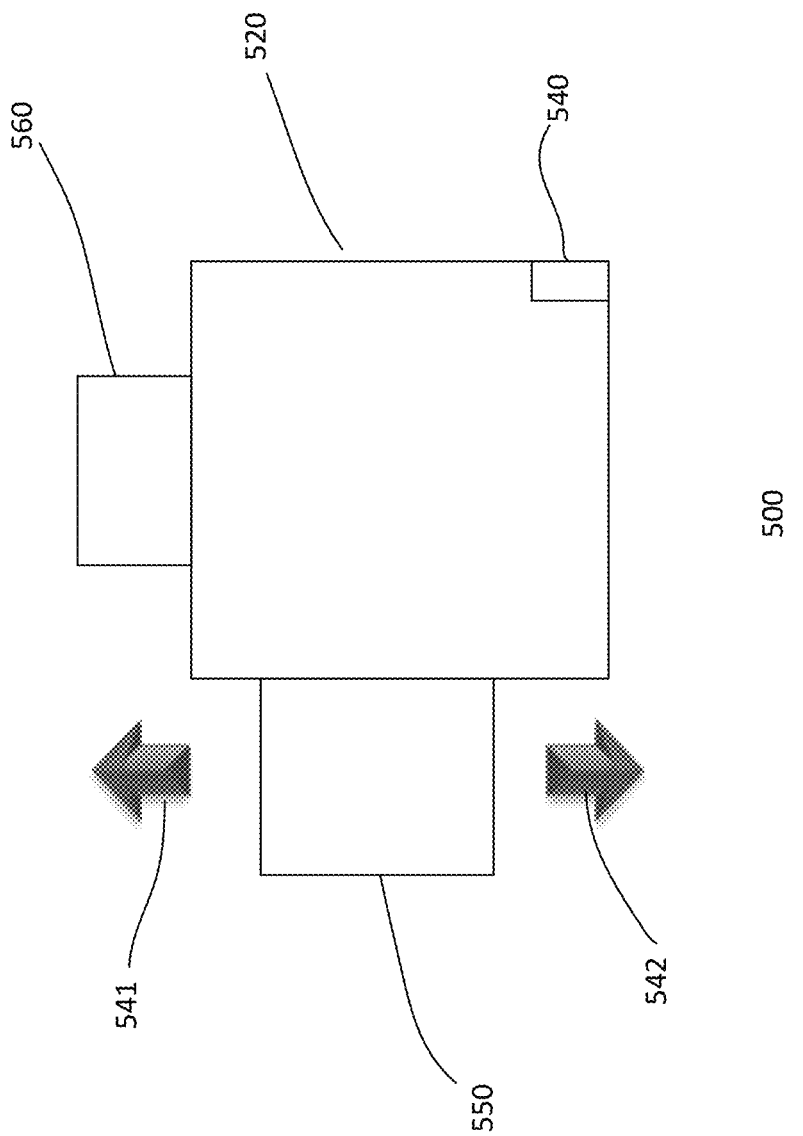

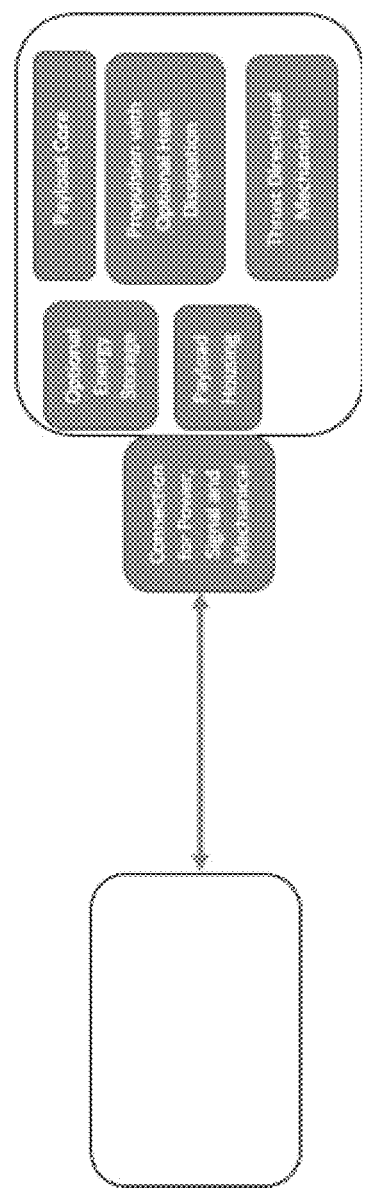

SELF-PROPELLED PAYLOADS FOR AIRCRAFT

CROSS-REFERENCE TO RELATED APPLICATION

This application claims the benefit of U.S. Provisional Application No. 62/768,120, titled "Self-Propelled Payloads for Aircraft", filed on Nov. 16, 2018, which is incorporated herein by reference in its entirety for all purposes.

FIELD OF THE INVENTION

The present disclosure relates to a self-propelled payload (SPP) for aircraft. In particular, the SPP is configured for unmanned aircraft, such as drones.

BACKGROUND

Unmanned aircraft, such as drones, are finding numerous applications. Drones are used in, for example, security monitoring, delivery services, capturing pictures or videos, as well as other applications. To fulfill the numerous purposes, drones are mounted with a payload. Payloads, for example, may include cameras, packages as well as other types of payloads. Furthermore, multiple payloads may be attached to an aircraft.

Since payloads affect the aircraft's center of gravity of an aircraft, total weight, as well as stability, placement of the payload imposes significant consideration. Placement of payloads often results in a compromise between optimal placement of payload for maximum payload effectiveness and aircraft performance. In addition, some payloads may be dynamic payloads. Dynamic payloads include, for example, fuel which reduces weight over time during operation of the aircraft. In addition, dynamic payloads may include tethered payloads that are connected to the aircraft by a cable. Tethered payloads may include, for example, external data and fuel connections. With tethered payloads, additional uncertainty, such as the environment, comes into play. Dynamic payloads add complexity to configuring the aircraft for effective operation.

From the foregoing discussion, there is a need to provide aircraft which are configured for effective operation regardless of the payload.

SUMMARY

Embodiments generally relate to effective operation of aircraft regardless of payload. In particular, the disclosure relates to self-propelled propulsion (SPP) systems for aircraft to compensate for payloads to improve operational effectiveness of the aircraft.

In one embodiment, an aircraft includes an aircraft propulsion system. A self-propelled payload (SPP) system is mounted onto the aircraft. The SPP system includes an SPP propulsion unit which is independent of the aircraft propulsion system. The SPP system includes a controller for controlling the SPP propulsion unit to compensate for a change in the aircraft's center of gravity due to a payload of the aircraft, including the SPP to improve aircraft operational effectiveness.

In another embodiment, a self-propelled payload (SPP) system is provided. The SPP system is configured for mounting onto an aircraft. The SPP system includes an SPP propulsion unit which is independent of the aircraft propulsion system. The SPP system includes a controller for controlling the SPP propulsion unit to compensate for a change in the aircraft's center of gravity due to a payload of the aircraft, including the SPP to improve aircraft operational effectiveness.

In yet another embodiment, a method of operating an aircraft is provided. The method includes providing an aircraft includes an aircraft propulsion system. A self-propelled payload (SPP) system is mounted onto the aircraft. The SPP system includes an SPP propulsion unit which is independent of the aircraft propulsion system. The SPP system includes a controller for controlling the SPP propulsion unit to compensate for a change in the aircraft's center of gravity due to a payload of the aircraft, including the SPP to improve aircraft operational effectiveness.

These and other advantages and features of the embodiments herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of various embodiments. In the following description, various embodiments of the present disclosure are described with reference to the following, in which:

FIG. 4 shows a simplified block diagram of a simplified embodiment of a propulsion module of an SPP system;

FIG. 5 shows a simplified block diagram of an embodiment of an SPP system;

DETAILED DESCRIPTION

As discussed, the aircraft may carry one or more payloads. The one or more payloads may be collectively referred to as the payload. The payload can include any kind of payload. For example, the payload may include cargo, fuel, scientific instruments, monitoring instruments. The payload can be mounted anywhere on the aircraft, including by tethering using a cable. Various forces can be experienced by the payload. For example, gravity can impact the flight of the aircraft due to a shift in the aircraft's center of gravity. In the case of a tether connection, the cable may impact a pull force which is different from gravity. These various forces experienced by the payload negatively affect operational effectiveness of the aircraft.

The present disclosure describes self-propelled payloads (SPPs) system for aircraft. An SPP system provides an independent propulsion unit from the propulsion system of the aircraft. The SPP system is configured to generate an internally adjustable force to compensate for the weight or force experienced by the payload. For example, the SPP is configured to negate forces experienced by the payload, such as force imposed on the aircraft by payload weight and/or attached disturbances as well as providing some degree of compensation for forces experienced from wind or natural elements. This improves operational effectiveness of the aircraft.

In some embodiments, the SPP system may include an actuator to continually direct the thrust against the pull of gravity and/or disturbances to compensate for change in aircraft's attitude or position. This actuator may be controlled by various types of controllers, such as with electromechanical control systems or passive mechanical systems which may be affected by the disturbance force. The direction and magnitude of thrust can be automatically controlled by the SPP system.

Figure 1A:
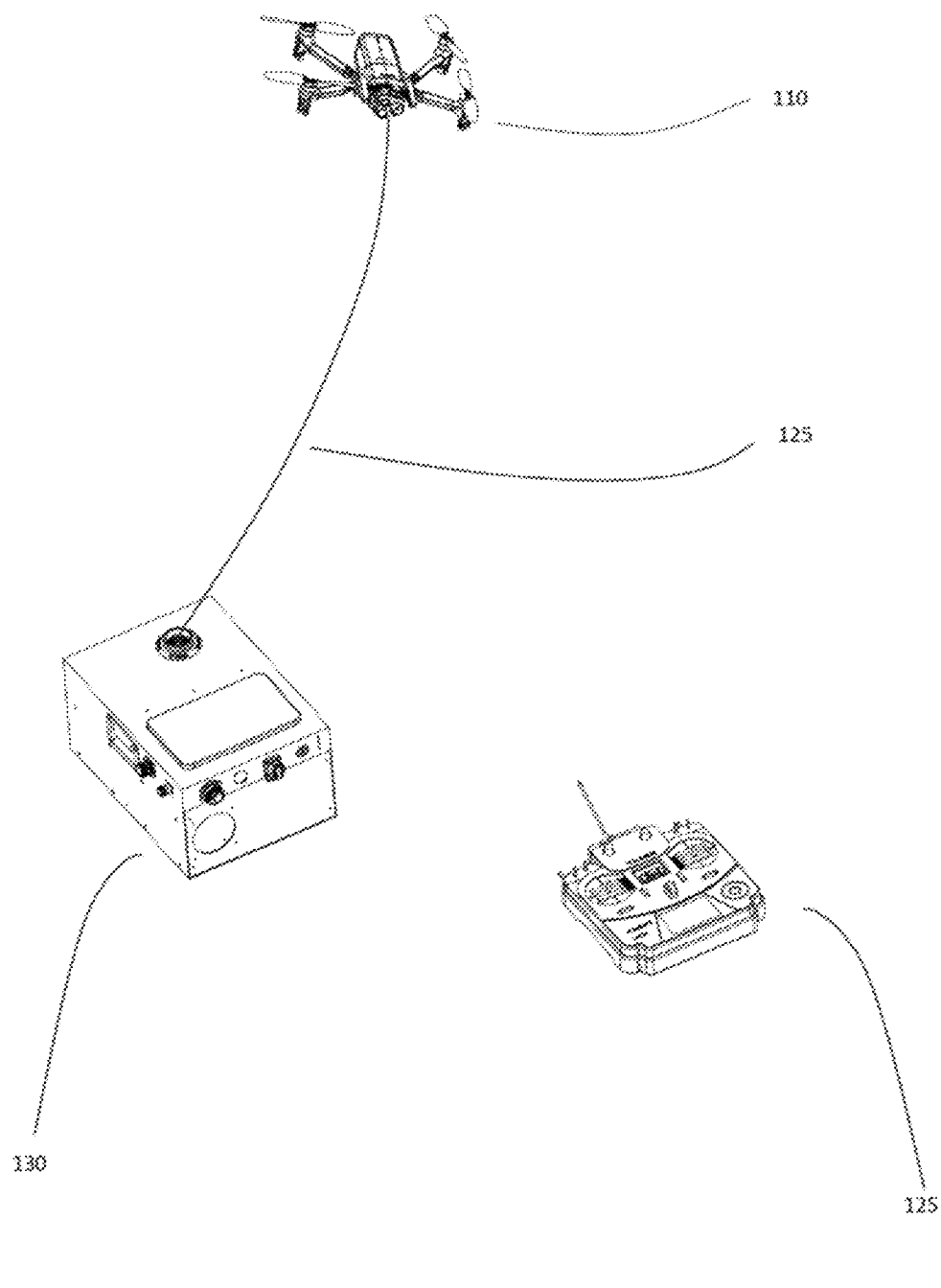
FIGS. 1$a$-1$b$ show an application of an embodiment of a self-propelled payload (SPP) system for an aircraft.
Figure 1B:
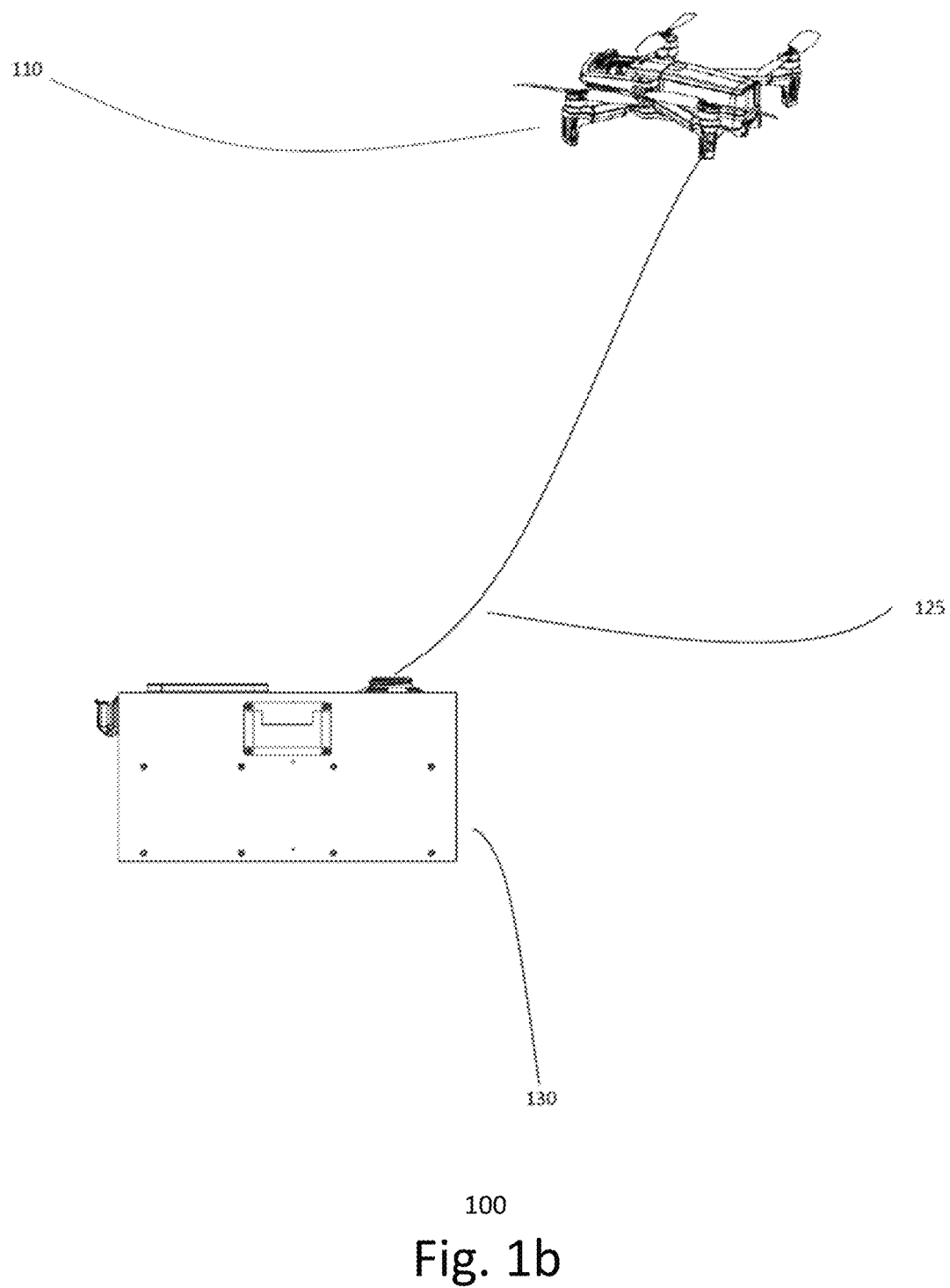

FIGS. 1a-1b shows an embodiment of an unmanned aircraft system 100. In FIG. 1a, the system is shown with the aircraft 110 grounded. The aircraft 110, for example, is a drone. The drone includes an SPP system mounted thereon to compensate for a payload. For example, the SPP system includes an SPP propulsion unit and electronics for controlling it. The SPP system may be powered by the power unit of the aircraft or by its own power supply. In one embodiment, the aircraft is tethered to a ground unit 130 by a tether cable 125. The ground unit, for example, may provide an external fuel source for the aircraft. For example, the tether cable provides current to power the propulsion system of the aircraft and/or the SPP system. The tether cable may also include a data link for uploading and downloading data or instructions to and from the aircraft. Other configurations of the ground unit may also be useful. An aircraft controller 105 is used to control the operation of the aircraft. The aircraft controller can control the flight, the SPP system as well as the payload, such as detaching the tether cable. In one embodiment, the SPP system is self-controlling. For example, the direction and thrust may be automatically adjusted. Providing an SPP system which can be manually controlled may also be useful or a combination of automatic and manual control. The aircraft controller may also control other functions.

FIG. 1b shows the unmanned aircraft system 100 with the aircraft in flight. As discussed, the aircraft is tethered to the ground unit 130 by a tethering cable 125. Although the tethering cable appears to be short, it is understood that the cable can be much longer. For example, the cable should be sufficiently long to accommodate the range of the aircraft controller (not shown). As also discussed, the aircraft includes an SPP system to compensate for the load applied by the tethering cable. This may include natural elements, like the wind, as well as tension by the cable itself and other payloads attached to the aircraft.

Figure 2A:
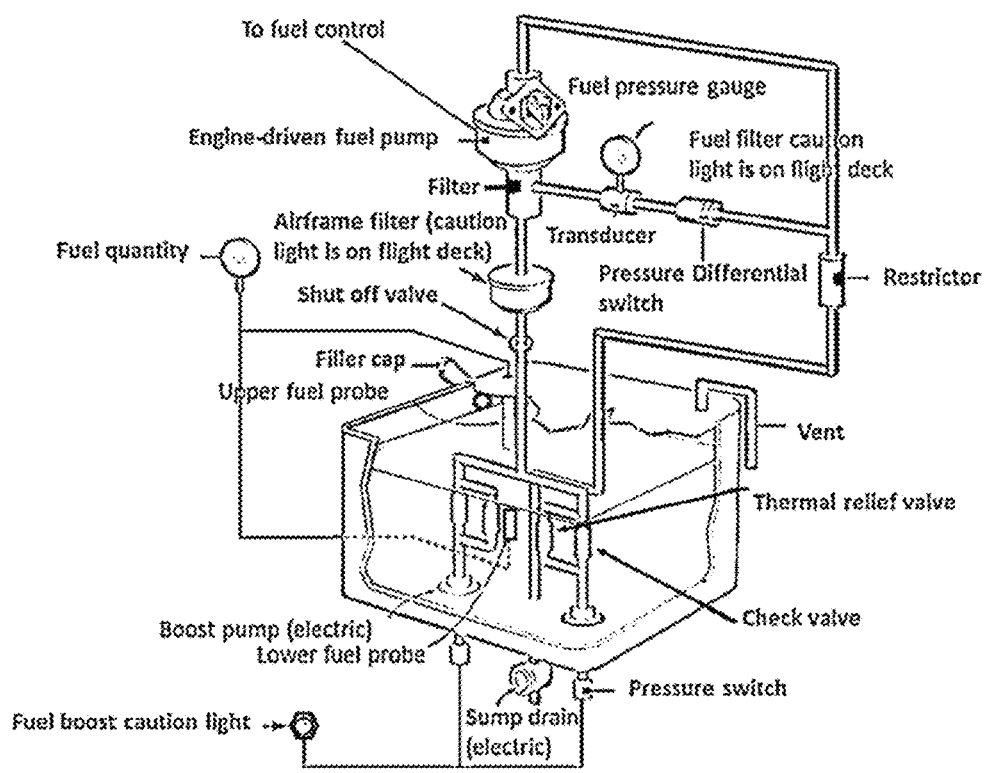
FIGS. 2$a$-2$b$ show embodiments of dynamic fuel systems for an aircraft.
Figure 2B:
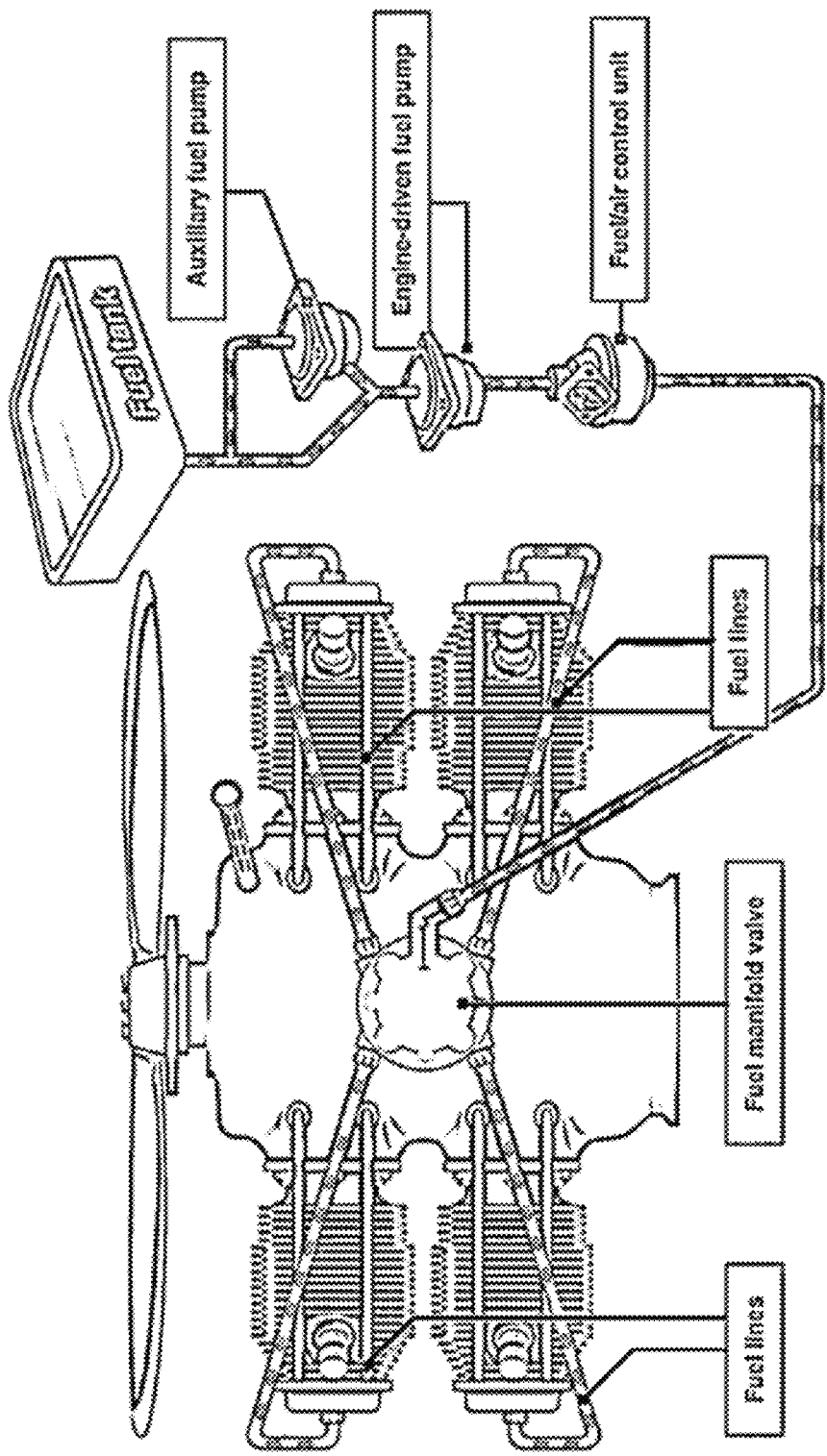

FIGS. 2a-2b show exemplary dynamic fuel supply systems for the aircraft. Referring to FIG. 2a, the fuel supply system 200 includes a fuel tank that feeds fuel the propulsion system of the aircraft. The fuel supply system includes a fuel pump, various gauges and valves for controlling fuel to the propulsion system as well as providing necessary fuel information. During operation, the fuel is consumed by the propulsion system, reducing the overall weight of the fuel payload.

Referring to FIG. 2b, similar to FIG. 2a, the dynamic fuel supply system 200 includes a fuel tank that provides fuel to the propulsion system of the aircraft. During operation, fuel is consumed by the propulsion system. This reduces the weight of the fuel payload of the aircraft.

Figure 3B:
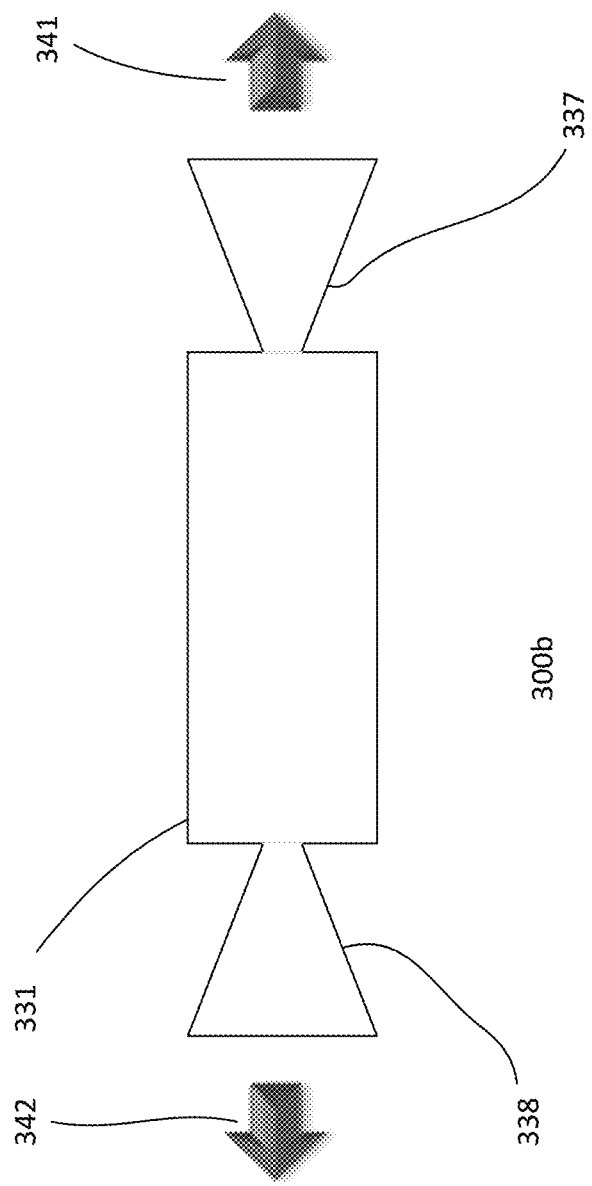
FIGS. 3$a$-3$c$ show various propulsion units for an SPP system.

FIGS. 3a-3c show various embodiments of propulsion units for an SPP system. FIG. 3a shows a propeller-based propulsion unit 300a. The propulsion unit, as shown, includes a propeller 335 driven by a motor. In one embodiment, the motor is an electric motor. The use of other types of engines, such as gas or combustible fuel, may also be useful. The propeller and motor, for example, are encased in a propulsion unit housing 331. Rotating the propeller creates thrust along the direction of the rotational axis of the propeller, as indicated by the arrows 341 and 342. When the propeller is rotated in, for example, the clockwise direction, thrust is created in a first direction as indicated by arrow 341. Reversing the rotation of the propeller produces a thrust in the second or opposite direction, as indicated by arrow 342.

Referring to FIG. 3b, a gas propelled propulsion unit 300b is shown. In one embodiment, the gas propelled propulsion unit may employ compressed gas. The compressed gas, for example, is contained within a container tank 331. As shown, the container tank is configured with. Valves, such as electronic valves, may be used to control which opening and amount of compress gas to release to generate thrust through the first or second port, as indicated by arrows 341 and 342. The magnitude of thrust generated depends on the flow rate of the compressed gas which is released.

In another embodiment, the gas propelled propulsion unit may employ propellant gas. The direction of thrust can be controlled by electronic valves. The magnitude of the thrust may be controlled by the rate of mixture of the propellant fuel, the rate of gas discharge of the propellant fuel or a combination of both.

Referring to FIG. 3c, a digital solid state propulsion unit 300c is shown. The propulsion unit is contained within an insulated support 331. The propulsion unit includes a wire 355. The wire, for example, serves as a first electrode 339. The propulsion unit also includes second and third electrodes 333 and 343 which are electrically coupled to the propulsion unit driver. High positive and negative voltages are provided to the electrodes. To generate thrust in a first direction, as indicated by arrow 341, a high positive voltage is applied to the first electrode 339 and a high negative voltage is applied to the second electrode 333. To reverse the direction of thrust, as indicated by arrow 342, a high positive voltage is applied to the first electrode 339 and a high negative voltage is applied to the third electrode 343. The magnitude of the voltages may be used to control the magnitude of thrust. In addition, the propulsion unit can be scaled by replicating the propulsion unit to increase thrust.

FIG. 4 shows a simplified block diagram of an embodiment of a propulsion module 400 of an SPP system. As shown, the propulsion module includes a propulsion unit 300 and a propulsion control unit 422. The propulsion control unit is coupled to the propulsion unit for controlling the propulsion unit to generate the desired amount of thrust. For example, one or more control lines couple the control unit to the propulsion unit. Other configurations of coupling the control unit to the propulsion unit may also be useful. For example, the control unit may be wirelessly coupled to the propulsion unit. The control unit receives one or more control inputs 414 and one or more power inputs 412. Power at the power inputs may be employed to operate the control unit. In some cases, depending on the propulsion unit, the power may also be employed to operate the propulsion unit via the control unit.

The control unit receives a control signal at the control input which indicates the magnitude of thrust 441 to be generated. In addition, the control input signals may also determine the direction of thrust to be generated. Based on the control input, the control unit provides the necessary electrical signals through one or more signal lines 428 to the propulsion unit to generate the desired magnitude of thrust in the desired direction.

In one embodiment, the propulsion unit includes a propeller driven propulsion unit with an electric motor. The control unit, for example, is a motor driver. Based on the control input which indicates the desired amount of thrust to generate, the motor driver provides appropriate power to the propulsion unit. This causes the motor to rotate at a selected RPM to generate the desired amount of thrust. The direction of thrust may be controlled by reversing the rotation of the motor.

In another embodiment, the propulsion unit includes a gas propelled propulsion unit. The control unit, for example, is an actuator controller. Based on control input which indicates the desired amount of thrust to generate, the actuator controller provides appropriate signal to the propulsion unit to control one or more valves. This results in gas releasing to generate the desired amount of thrust. The direction of thrust can be reversed by turning on the appropriate valves to direct thrust in the opposite direction.

In some embodiments, the propulsion unit includes a digital solid state thruster. In such cases, the control unit, for example, is a high voltage controller. Based on control input which indicates the desired amount of thrust to generate, the high voltage controller provides appropriate power to the electrodes of the propulsion unit. This causes the solid state thruster to generate the desired amount of thrust. The direction of thrust may be achieved by powering the negative voltage electrode in the direction of thrust.

FIG. 5 shows a simplified block diagram of an embodiment of an SPP system 500. The SPP system includes a payload unit 520 and a propulsion unit 550. The propulsion unit, for example, is mounted onto the payload unit. The propulsion unit is configured to generate thrust in first and second opposing directions, as indicated by arrows 541 and 542. The payload unit may include electronics for controlling the propulsion unit. For example, the electronics may control the magnitude and direction of thrust. The electronics may also include electronics for sensing force disturbances. For example, the electronics control the magnitude and direction of thrust based on force disturbances sensed.

The payload unit may include an internal power source for supplying power to the SPP module. The internal power source may be used to power the electronics as well as the propulsion system. The power source may be a battery, fuel cell, combustible or pressurized gas, or a combination thereof. The power source may, for example, depend on the type of propulsion system.

In other embodiments, the power source for the SPP module may be from an external power source. For example, the power source for the SPP module may be external to the SPP. The external power source may be from the aircraft power source, power from a tethered cable coupled to a tether connector 540, or a combination thereof. The aircraft power source may also include energy harvesting modules, such as solar or wind energy harvesting modules. Other types of external energy sources may also be useful. For some applications, the payload may include a voltage converter conditioning high voltage tethered power to a voltage that is usable by the payload and/or the aircraft. Alternatively, fluid or air medium can also be used for energy transfer, with the payload doing some form of energy conversion, such as airflow to electrical energy. Furthermore, the power source of the SPP module may be derived from a combination of internal and external power sources.

Figure 6:
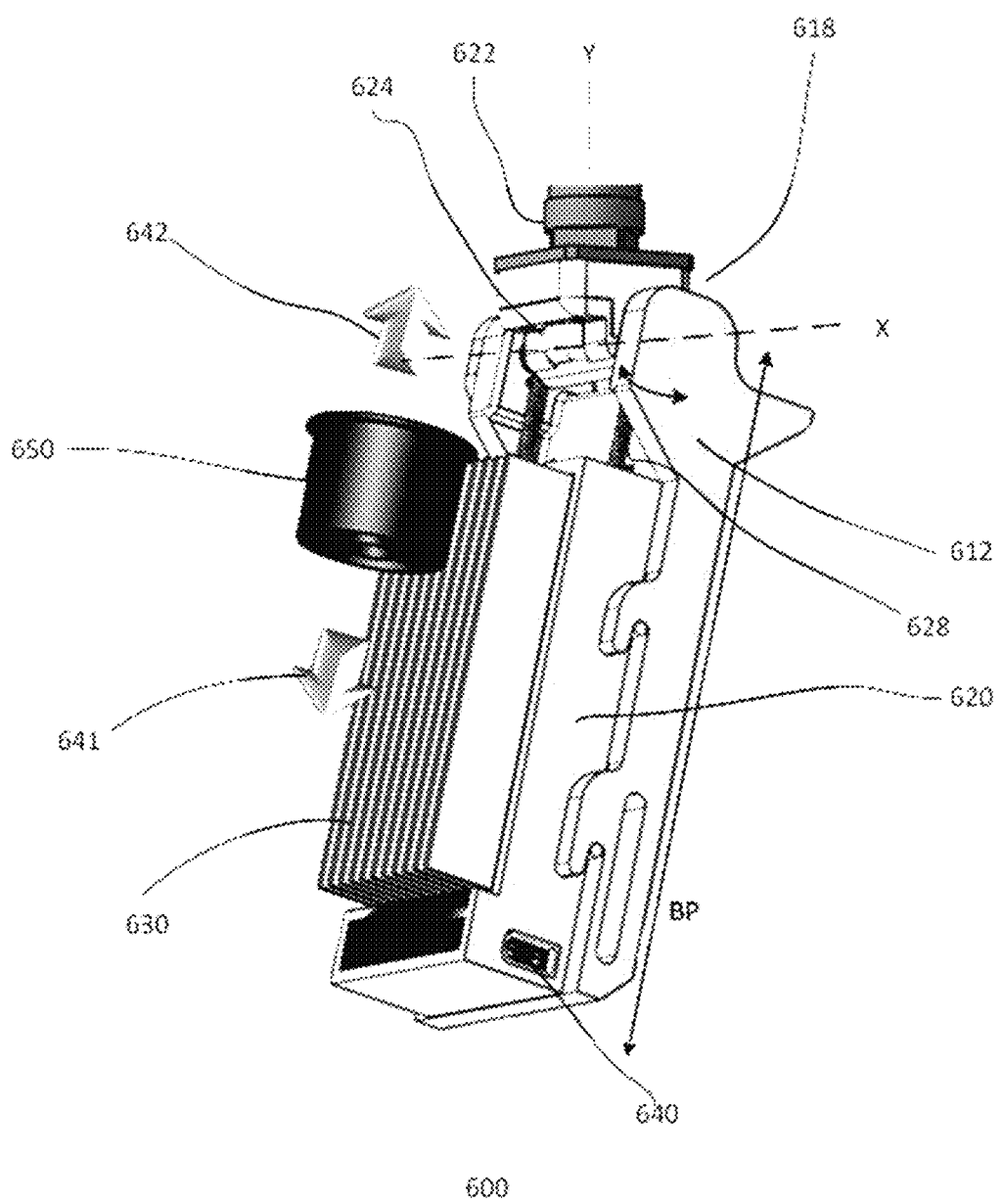
FIG. 6 shows an embodiment of an SPP system in greater detail.

FIG. 6 shows an embodiment of an SPP system 600 in greater detail. As shown, the SPP includes an SPP housing 612 on which an SPP payload unit 620 is mounted. For example, the housing is configured to accommodate an SPP payload unit. The payload unit can be locked into position by, for example, engaging locking units. Removal of the payload unit from the housing can be accomplished by disengaging the locking unit. The locking units, for example, may include screws or other types of fasteners. Other types of locking units may also be useful. For example, retection hooks for release of materials, payloads and/or tethered cables while in operation. Also, bayonet type interfaces may be used to facilitate fast and easy changing of payloads.

The SPP system may include a heat dissipation unit 630, such as a heat sink. The heat dissipation unit, of example, is mounted onto the payload. As shown, the heat dissipation unit is mounted onto a major surface of the payload opposing the surface which is mounted onto the housing. For example, the payload is disposed between the housing and heat dissipation unit. Other configurations of the heat dissipation unit, payload and housing may also be useful. In some cases, no heat dissipation unit is provided.

The SPP includes a propulsion unit 650. The propulsion unit, in one embodiment, is configured to generate thrust in first and second directions, as indicated by arrows 641 and 642. For example, the propulsion unit is mounted onto the SPP payload to generate thrust in first and second directions parallel to a plane of the base of the housing BP. The propulsion unit, in one embodiment, is a propeller driven propulsion unit. The propeller may be coupled to a motor for rotating the propeller. The motor, for example, may be an electric motor. Other types of motors and engines may also be useful. In other embodiments, the propulsion unit may be a gas propelled propulsion unit, such as compressed gas or propellant gas, or a solid state propulsion unit. Other types of propulsion units may also be useful.

As shown, the propulsion unit is mounted onto the heat dissipation unit. In some embodiment, the propulsion unit may be mounted onto the payload, for the case where no heat dissipation unit is provided for the SPP. Other configurations of mounting the propulsion unit may also be useful. For example, the propulsion unit may be mounted onto the housing.

The payload unit includes various sub-units for controlling the propulsion unit 650. For example, the payload unit includes a propulsion control sub-unit which controls a desired amount and direction of thrust to be generated by the propulsion unit. For example, the control sub-unit may include a motor driver for controlling the speed of the motor of a propeller unit. In other cases, the control sub-unit may include actuator controller for gas propelled propulsion unit or a high voltage controller for a solid state propulsion unit. Other types of control sub-units may also be useful.

The payload may also include a force monitoring sub-unit. The force monitor subunit includes electronics for determining an amount of thrust to generate based on a force sensor sensing a force imposed by the payload. In one embodiment, the force imposed by a payload is registered as a shift in position in the payload. For example, a force sensor is employed to sense a shift in the position of the payload.

The shift in position, in one embodiment, is facilitated by the movement in the housing. The housing, in one embodiment, includes a housing 618. The housing mount is configured to be mounted to the aircraft. For example, the mount includes an aircraft rotatable joint 622 which is mounted to the aircraft. The aircraft rotatable joint, in one embodiment, is configured to swivel around an axis Y. For example, the mount is configured to be rotatable 360° around axis Y by the rotatable joint. The axis Y, for example, is about perpendicular to the ground when mounted onto a grounded aircraft. The degree may vary between about 85° to 95° to the ground, depending on how the mount is mounted to the aircraft. Providing a Y axis which has other angles with respect to the ground may also be useful. For example, the Y axis may be from −90° to 90°.

The housing mount also includes a housing body joint 624. The housing body 612 is coupled to the housing mount via the housing body joint. In one embodiment, the housing body joint enables the housing body to be rotatable around an X axis, which is perpendicular to the Y axis. In one embodiment, the housing body joint is configured to rotate up to 90° with respect to the Y axis. Providing a housing body joint which can rotate more or less than 90° may also be useful. For example, the housing body joint may be configured to rotate 180° or 360° with respect to the Y axis. As such, the housing mount provides two degrees of freedom for the movement of the housing body, around the Y axis and around the X axis.

In some embodiments, the housing body joint may be a motorized joint, allowing the controller to control the movement of the joint. Other configurations of the joint may also be useful. For example, the housing body joint may be a motorized gimbal assembly to enable control of the direction of thurst by the propulsion unit.

In one embodiment, a force sensor 628 is mounted onto the housing body and housing body joint to sense the shift in the position of the housing body with respect to the housing mount. The force sensor may be strain gauge or spring-loaded sensor which is capable of correlating force with displacement. Other types of force sensors may also be useful. In the case of a spring-loaded sensor, the force can be defined as follows:

$$F=-kx,$$

where,
F=force,
k=known spring constant, and
x=displacement.

The displacement can be determined by various techniques. For example, displacement can be determined using a location sensor, such as a laser, a potentiometer, as well as other types of location sensors. In the case of a strain gauge, the force can be determined directly from the sensor output according to the manufacturer's datasheet.

As discussed, the control sub-unit determines the magnitude and direction of the thrust of the propulsion unit based on the force sensed from the force sensor. Various techniques may be employed to control the thrust of the propulsion unit. The thrust of the propulsion unit may be controlled to maintain the desired resultant force needed. For example, the resultant force needed may depend on disturbances or variations in the payload weight. In one embodiment, the control sub-unit includes a control loop used to control the thrust of the propulsion unit. The control loop, for example, is a proportional-integral-derivative (PID) controller. Various types of PID controllers may be employed. For example, the PID controller may be an analog PID controller or a digital PID controller. PID controllers offer a good closed loop system with low offset and reasonable dynamic performance.

In one embodiment, a static force implementation is employed. In such a case, a controlled position for the SPP system is defined. The control position, for example, is the desired position. The control position has an associated desired force. As such, any force deviation from the desired value is regarded as an error. For example, the error can be determined by comparing the sensed value with the desired value. The desired value may be based on the maneuver to be performed. For example, different desired values may be defined for different maneuvers, such as hovering, flying normally, turning right or left, climbing and diving. The error can be fed into the control sub-unit for a desired response to the propulsion unit to maintain the desired force.

Other techniques for controlling the propulsion unit to result in the desired resultant force may also be useful. For example, a horizontal situation indicator (HIS) may be used to determine the position of the aircraft. Deviation from the desired position on the HSI may be considered as an error position, which is fed into the control sub-unit to generate the desired response for the propulsion unit to maintain the desired force at the required direction. The desired position may be defined based on the maneuver to be performed. For example, different positions may be defined for different maneuvers, such as hovering, flying normally, turning right or left, climbing and diving.

The payload unit may also include an internal power source sub-unit for operating the various subunits as well as the propulsion unit. The power source may be a battery, fuel cell, combustible or pressurized gas, or a combination thereof. The power source may, for example, depend on the type of propulsion system.

In other embodiments, the power source for the SPP module may be from an external power source. For example, the power source for the SPP system may be external to the SPP system. The external power source may be from the aircraft power source, power from a tethered cable coupled to a tether connector 640, or a combination thereof. The aircraft power source may also include energy harvesting modules, such as solar or wind energy harvesting modules. Other types of external energy sources may also be useful. For some applications, the payload may include a voltage converter conditioning high voltage tethered power to a voltage that is usable by the payload and/or the aircraft. Alternatively, fluid or air medium can also be used for energy transfer, with the payload doing some form of energy conversion, such as airflow to electrical energy. Furthermore, the power source of the SPP system may be derived from a combination of internal and external power sources.

Figure 7A:
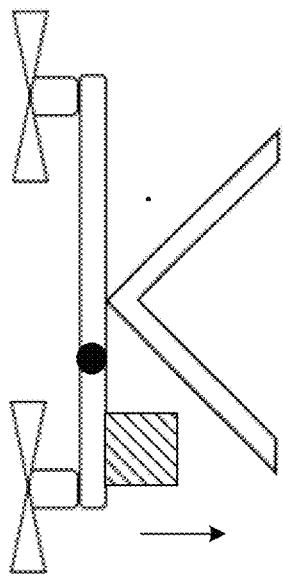
FIGS. 7$a$-$c$ show simplified diagrams of a shift in the center of gravity due to payload and compensation by the SPP system to negate the effect of the payload.
Figure 7B:
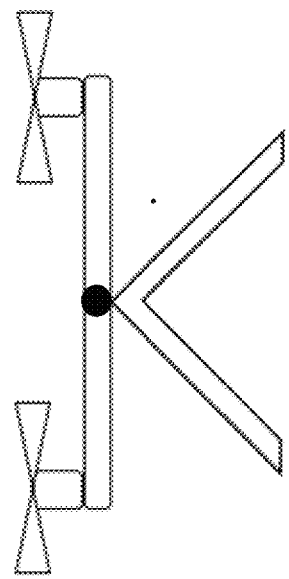
Figure 7C:
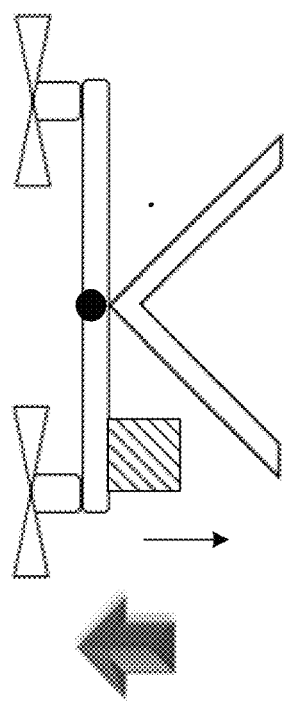

FIGS. 7a-7c show simplified exemplary configurations of aircraft with and without an SPP system. Referring to FIG. 7a, a configuration 700a of an aircraft 710 is shown. The aircraft, for example, is configured with a neutral center of gravity 711 at about a center thereof. For example, the aircraft's neutral center of gravity is symmetrical. By neutral, it refers to the normal center of gravity without any payload. Providing a neutral center of gravity at other parts of the aircraft (asymmetrical) may also be useful, for example, for different flying conditions.

As shown in FIG. 7b, the aircraft configuration 700b includes an aircraft 710 with an SPP system 709 mounted thereon. The SPP system, as shown, is mounted on a side of the aircraft, such as the left side. The weight of the SPP imposes a force $F_{SPP}$, shifting the center of gravity 711 of the aircraft to the left towards the SPP system. The force $F_{SPP}$ may be equal to the weight of the SPP. As shown in the aircraft configuration 700c in FIG. 7c, although the SPP imposes a force on the aircraft, the propulsion unit of the SPP can be configured to generate a thrust equal to $-F_{SPP}$ to negate the effect of the weight of the SPP system, shifting the center of gravity 711 of the aircraft back to the neutral position. This improves the operational effectiveness of the aircraft. The thrust of the SPP system can be adjusted based on one or more additional payloads on the aircraft. The SPP system enables flexible mounting of payloads on the aircraft without affecting operational effectiveness.

In other embodiments, the SPP generates a thrust to produce the desired center of gravity for the aircraft. The desired center of gravity need not be at the center of the aircraft. For example, the desired center of gravity may be other than symmetrical. This may be desirable due to the configuration of the aircraft. For example, shifting the center of gravity of the aircraft from symmetrical may be desired for certain maneuvers, such as turning, climbing or diving.

Figure 8A:
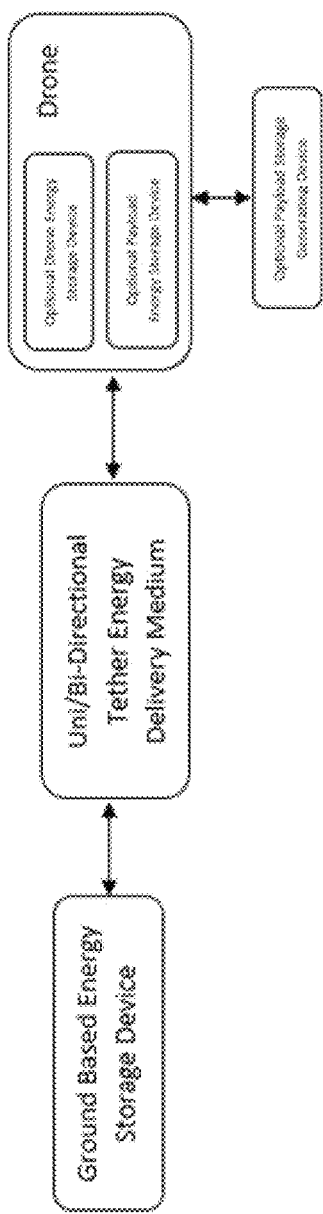
FIGS. 8$a$-8$c$ show simplified setups of aircraft with an SPP system.
Figure 8C:
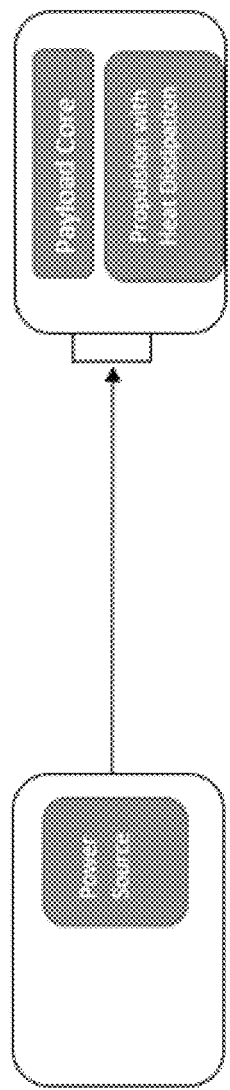
Figure 8D:
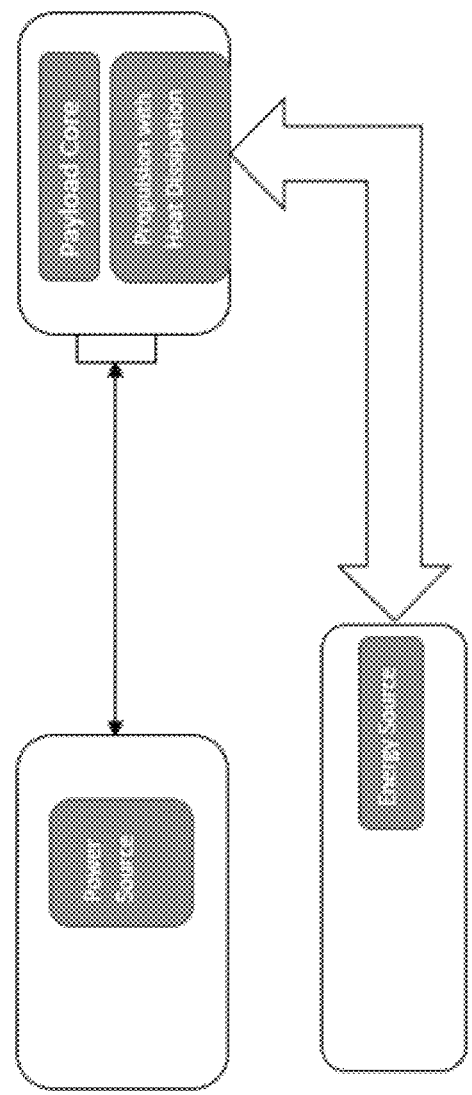

FIGS. 8a-8c show simplified block diagrams of various configurations of an aircraft with an SPP system. Referring to FIG. 8a, a configuration 800a of an aircraft 810 is shown. The aircraft is mounted with an SPP system 820. The SPP system includes a payload unit 826 and a propulsion unit 828. The payload unit includes sub-units for controlling the propulsion unit. The SPP system may include other units or sub-units, such as a heat dissipation unit and as well as an internal power sub-unit. As shown, the aircraft is configured to include a tethered connection 840 to provide power from an external source, such as a ground source, to power the aircraft and/or SPP. The aircraft may also be configured to have an aircraft power source. Other configurations of the aircraft may also be useful.

FIG. 8b shows another configuration 800b of an aircraft 810 with an SPP system 820. The SPP system includes a payload unit 826 and a propulsion unit 828. The payload unit includes sub-units for controlling the propulsion unit. The SPP system may include other units or sub-units, such as a heat dissipation unit and as well as an internal power sub-unit. As shown, the aircraft is configured to include a power source 812. The power source of the aircraft, in one embodiment, is configured to provide power for operating the aircraft as well as the SPP system. Other configurations of the aircraft may also be useful.

In FIG. 8c, another configuration 800c of an aircraft 810 with an SPP system 820 is shown. The SPP system includes a payload unit 826 and a propulsion unit 828. The payload unit includes sub-units for controlling the propulsion unit. The SPP system may include other units or sub-units, such as a heat dissipation unit and as well as an internal power sub-unit. As shown, the aircraft is configured to include a power source 812. The power source of the aircraft, in one embodiment, is configured to provide power for operating the aircraft as well as the SPP system. Furthermore, the SPP system is configured to include a tethered connection 840 which is coupled to a ground unit 860 by a tethered cable 865. The ground unit includes a ground unit power source 862 to power aircraft and/or SPP system. Other configurations of the aircraft may also be useful.

Figure 9A:
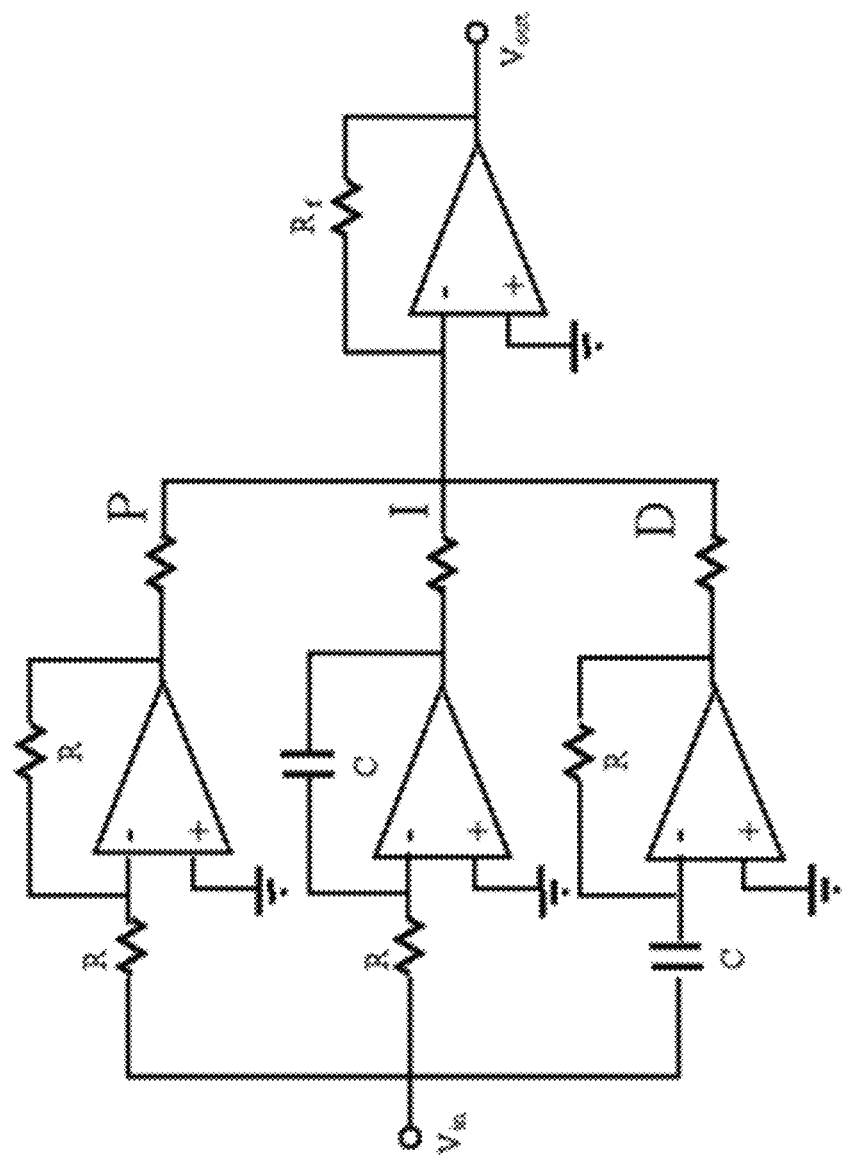
FIGS. 9$a$-$b$ show embodiments of compensation circuitry for the SPP system.
Figure 9B:
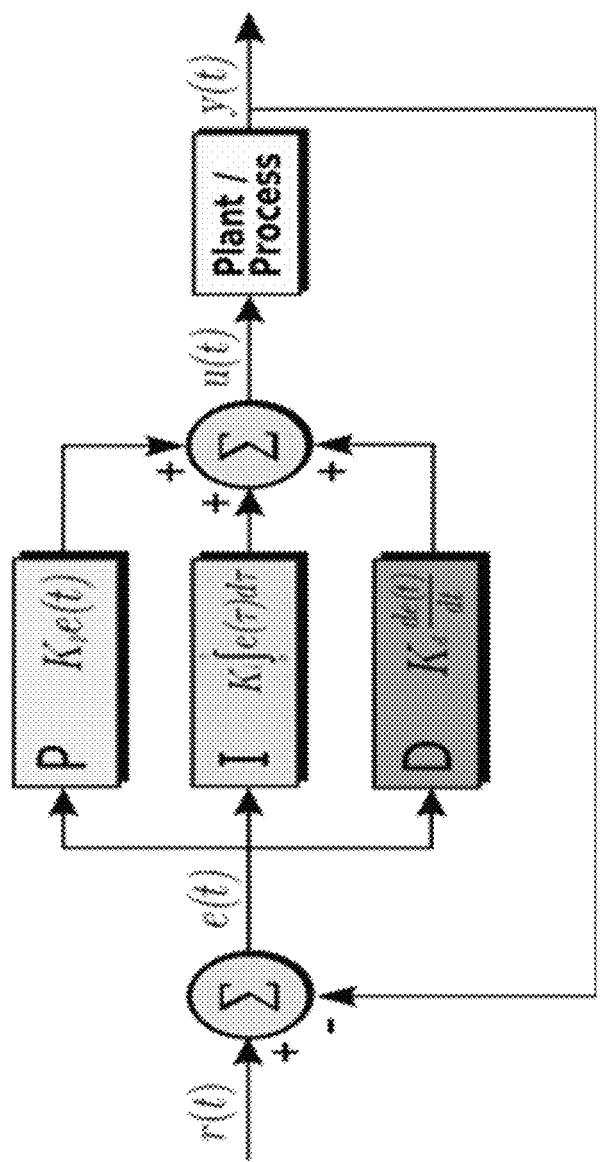

FIGS. 9a-9b show embodiments of a PID circuit for controlling thrust in the propulsion unit of the SPP system. Referring to FIG. 9a, an analog PID circuit 900a is shown. The analog PID circuit includes an input stage 910 and an output stage 920. The input stage is configured to receive an input signal Vin. The input signal, for example, is the error signal from the force sensor corresponding to a shift in position of the payload. As shown, the input stage includes three operational amplifiers which are configured in parallel and receives the input signal Vin. The amplifiers correspond to P, I and D of the PID control loop. The outputs of the amplifiers are provided to the input of the output stage amplifier which generates an output signal Vout. The output Vout is fed to the thruster and actuators for a desired response, and the corresponding force sensor readings are fed back to the input to recalculate the new error Vin, forming the negative feedback control loop.

FIG. 9b shows another embodiment of a PID circuit 900b. As shown, the PID circuit is implemented as a digital PID circuit. For example, a digital processor or controller may be programmed in the discrete time domain. As shown, the PID circuit includes an input stage 915 and an output stage 925. The input stage is configured to receive the input signal r(t). The input signal is provided to P, I and D program blocks. The outputs of the blocks are summed up and provided to the output stage, which generates an output signal y(t). The output is also used to control the magnitude and direction of thrust for the SPP system. This results in a change in sensor readings, which is used to deduce the new r(t) signal for feeding back to the input stage, forming the negative feedback closed loop control. A mechanical coupling which operates based on Newtonian's physics can be employed to control the direction of thrust by the propulsion unit.

Figure 10:
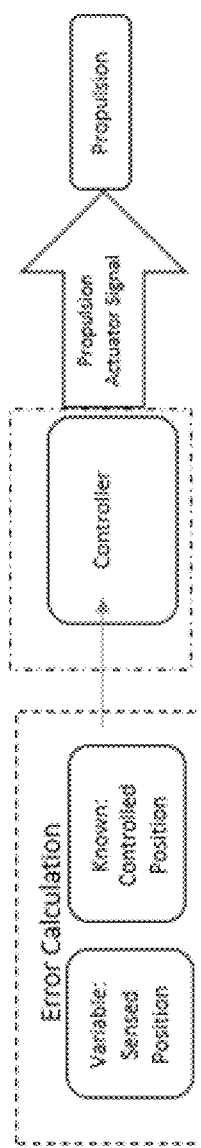
FIG. 10 shows a simplified diagram of the operation of the SPP system to correct for shifts in the center of gravity of an aircraft.

FIG. 10 shows a simplified block diagram of a control unit 1000 for the SPP system. The control unit includes an error calculation sub-unit 1020. In one embodiment, the error calculation sub-unit is configured for a dynamic force implementation. For example, the error calculation sub-unit is configured to sense a change in position or force and the desired force can be changed dynamically, resulting in the control loop reacting to adopt the new set value, effectively implementing a dynamic force implementation. In one embodiment the error calculation sub-unit senses the current position of the aircraft and compares the reading of the current position to the known controlled position. The difference is sent to the control circuit sub-unit 1030 as an input signal to generate an output signal to cause the SPP propulsion unit 1040 to generate the desired magnitude and direction of thrust.

In some embodiment, the payload may include associated electronics to track changes in payload position. For example, electronic sensors, such as an inertia measurement unit (IMU) may be used. An IMU typically includes primarily a gyroscope as well as other sensors, such as an accelerometer and/or a magnetometer measure position with typically 6 degrees of freedom. The IMU can be employed to achieve payload stabilization through disturbance rejection. In such applications, the controlled position is, however, directed at the direction of disturbance. The magnitude of disturbance can be either calculated through the accelerometer or using the air thrust controller independently. With the use of IMU based position data, the payload can register external disturbances and change in aircraft position independently, which the payload with a motorized gimbal air thruster can be directed to counteract the disturbance force.

While the propulsion unit can be independent of the SPP directional control, a mechanical coupling which operates based on Newtonian's physics can be employed to control the direction of thrust by the propulsion unit. For example, the mechanical coupling results in the thrust of the propulsion unit to be pointed in a direction towards the direction of the resultant force. Resultant force, for example, refers to a combination of weight and disturbance force. This can be achieved by anchoring the SPP on a swivel, or a universal joint, where the SPP can swing about the mechanical joint when subject to disturbances. The angle of deflection of the SPP with reference to the mechanical joint, is the angle of the resultant force acted upon on the SPP. Thus this allows for the SPP to independently manage its own thrust direction, independent of the thruster control.

Other methodologies include using a natural gyroscope joint, based on anchoring of payload at its center of gravity point. Thus the payload will deflect in direction based on the angle of resultant force acting on it. This achieves a natural compensation mechanism to account for the angle of deflection. The type of joint employed may depend on, for example, the application.

Figure 11A:
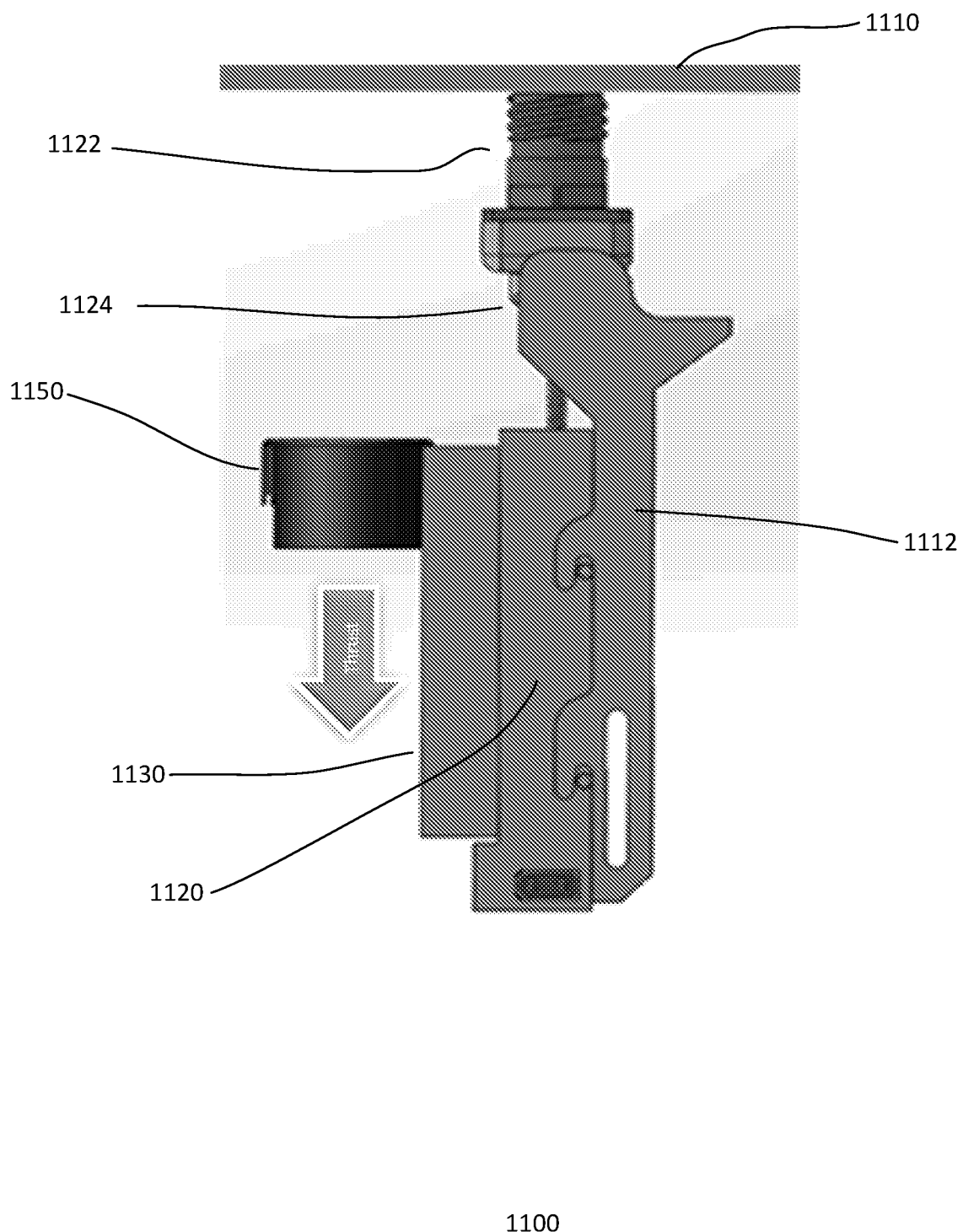
FIGS. 11$a$-11$b$ show an SPP system in different states.
Figure 11B:
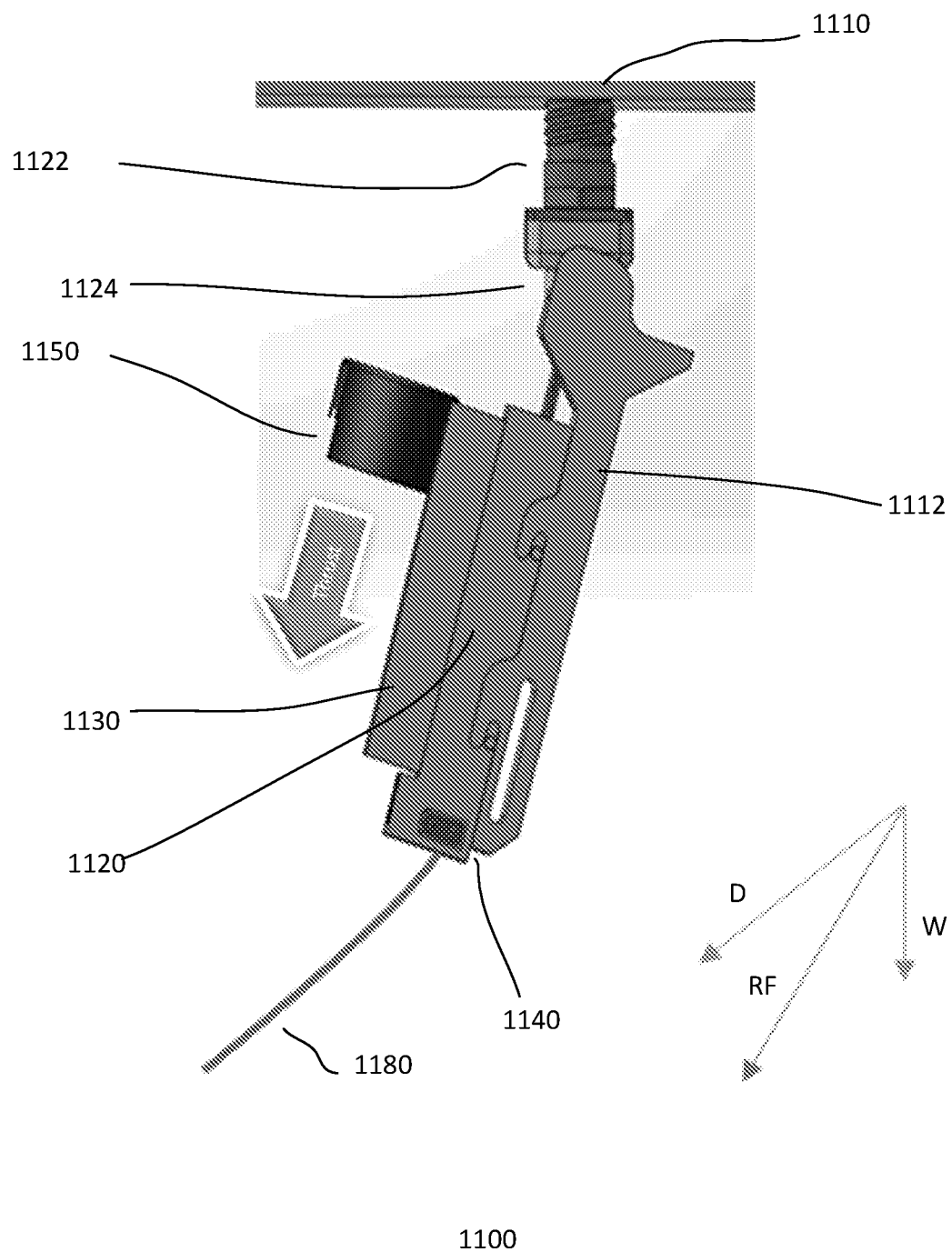

FIGS. 11a-11b show an SPP system in different states. The SPP system is similar to that described in FIG. 6. Common elements may not be described or described in detail. Referring to FIGS. 11a-11b, the SPP system 1100 is mounted on an aircraft 1110 via a housing mount 1122. The housing mount also includes a housing body joint 1124 on which a housing body 1112 is mounted. The housing body houses a payload 1120 with electronics for controlling a propulsion unit 1150 of the SPP system. The SPP system may include a heat dissipation unit. The heat dissipation unit, for example, is disposed between the propulsion unit and the payload unit. As discussed, the housing body joint may be a mechanical joint which operates based on Newtonian's physics to control the direction of thrust by the propulsion unit. Other types of mechanical joints may also be useful.

As shown in FIG. 11a, the SPP system is in a rest position. For example, in the rest state, the weight of the SPP system causes it to be in an equilibrium position. In the equilibrium position, thrust is pointed directly towards the combination of gravitational weight and other devices, such as the tether cable. For example, the trust generated should be equal to the force created by the weight of the SPP system and other devices/disturbances caused to the SPP system. This negates the effect imposed by the SPP system.

In FIG. 11b, a tether cable 1180 is attached to a tether connector 1140 on the payload unit. The tether cable creates a pull experienced on the SPP system from the environment. For example, the pull creates a disturbance force D on the SPP system in addition to the weight force W of the SPP system, causing a positional displacement to occur. The positional displacement is registered and the controller generates a thrust (resultant force) RF to compensate for the disturbance.

The SPP system may be configured in different modes to generate resultant thrust. In one embodiment, the SPP system may include 1) full weight compensation mode, 2) static partial weight compensation mode, and 3) static over-weight compensation mode. In the full weight compensation mode, the spring of the spring tensioned position sensor should be at rest or in the 0 position. In the static weight compensation mode, the spring is positioned to result in the resultant force away from the aircraft. In the over-weight compensation mode, the spring is positioned such that the resultant force presses against the aircraft.

The use of spring tensioned position sensors enables monitoring of tensional pull, such as from the tether cable. The spring constant is a known number, depending on the model used. The position of the spring loaded point is the sensing variable. The position can be detected using various techniques, such as a linear rheostate (known resistance with position) or a linear encoder (digital or analog). The output signal of the position can be used to feed into the propulsion unit as an activation signal, where the gains of the pull signal can be calibrated to compensate for the disturbance force. The pull signal gains can be achieved using, for example, an analog circuit. Alternatively, the propulsion unit can be programmed with the required gains for the desired performance.

Figure 12A:
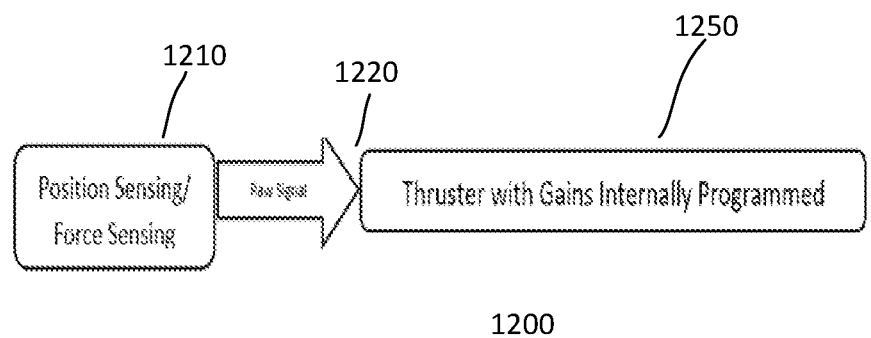
FIGS. 12$a$-$b$ show simplified embodiment of controllers with positioning sensors.

FIG. 12a shows a simplified block diagram of an embodiment of a controller unit 1200. As shown, the controller unit includes a positional sensor 1210. The sensor senses the shift in position of the SPP system. Based on the shift in position, a raw signal 1220 is generated and passed to the propulsion unit. In one embodiment, the propulsion unit 1250 is programmed internally with the desired gains. The output of the sensors is used to cause the propulsion unit to generate the desired thrust.

Figure 12B:
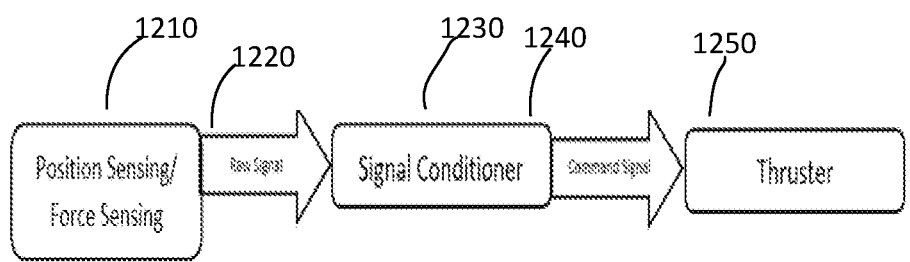

FIG. 12b shows a simplified block diagram of another embodiment of a controller unit 1200. As shown, the controller unit includes a positional sensor 1210. The sensor senses the shift in position of the SPP system. Based on the shift in position, a raw signal 1220 is generated and passed to a signal conditioner 1230. The signal conditioner, for example, includes a middleware to process the raw signal. The signal conditioner generates a command signal 1240, causing the propulsion unit 1250 to generate the desired magnitude of thrust. Providing a signal conditioner provide flexibility in adapting the controller unit to control different types of propulsion systems.

The inventive concept of the present disclosure may be embodied in other specific forms without departing from the spirit or essential characteristics thereof. The foregoing embodiments, therefore, are to be considered in all respects illustrative rather than limiting the invention described herein. The scope of the invention is thus indicated by the appended claims, rather than by the foregoing description, and all changes that come within the meaning and range of equivalency of the claims are intended to be embraced therein.

The invention claimed is:

1. An aircraft comprising:
   an aircraft propulsion system for propelling the aircraft;
   a horizontal situation indicator (HIS), the HIS indicates a position of the aircraft based on a center of gravity of the aircraft;
   a self-propelled payload (SPP) system mounted onto the aircraft, wherein the SPP system comprises
      an SPP propulsion unit independent of the aircraft propulsion system, the SPP propulsion unit is configured to generate thrust in first and second opposite thrust directions,
      a controller for controlling the SPP propulsion unit to adjust the position of the aircraft at a desired position according to a desired center of gravity of the aircraft, taking into consideration of a payload of the aircraft which includes the SPP system, wherein the desired position depends on a desired aircraft maneuver; and
   wherein adjusting the aircraft at the desired position comprises controlling the thrust in the first and second opposite directions to improve operational effectiveness of the aircraft based on the desired aircraft maneuver.

2. The aircraft of claim 1 wherein the aircraft comprises an unmanned aircraft.

3. The aircraft of claim 1 wherein the SPP system is mounted on a side of the aircraft.

4. The aircraft of claim 1 wherein the SPP system comprises:

an SPP housing unit, the SPP housing unit includes
  a mount for mounting the SPP system onto the aircraft, the mount includes a housing body joint,
  a housing body, the housing body is coupled to the mount by the housing body joint;
an SPP payload unit, the payload unit includes the SPP controller for controlling the SPP propulsion unit, the SPP payload unit is disposed onto the housing body; and
the SPP propulsion unit.

5. The aircraft of claim 4 wherein:
the mount comprises a rotatable mount configured to rotate around a y-axis which is about perpendicular to a horizontal position of the aircraft;
the housing body joint is configured to rotate around an x-axis which is about perpendicular to the y-axis; and
the first and second opposite thrust directions are parallel a plane of a base of the housing body.

6. The aircraft of claim 5 wherein the plane of the base of the housing body is about parallel to the y-axis.

7. The aircraft of claim 1 wherein the controller automatically controls the SPP propulsion unit to adjust the magnitude and thrust direction based on input from the HSI to maintain the desired position of the aircraft.

8. The aircraft of claim 1 wherein the desired aircraft maneuver comprises:
hovering;
normal flight;
right turn; and
left turn.

9. The aircraft of claim 1 wherein different desired aircraft maneuvers comprise different desired aircraft positions.

10. The aircraft of claim 1 wherein the payload comprises:
the SPP system; and
a dynamic payload which changes weight during flight.

11. The aircraft of claim 1 wherein the payload comprises:
the SPP system; and
an additional payload.

12. A self-propelled payload (SPP) system for an aircraft comprising:
an SPP mount configured to mount the SPP system onto an aircraft;
an SPP propulsion unit, wherein the SPP propulsion unit is independent of the aircraft's propulsion system, the SPP propulsion unit is configured to generate thrust in first and second opposite thrust directions;
an SPP controller, the SPP controller is configured to control magnitude and direction of thrust of the SPP propulsion unit adjust a center of gravity of the aircraft to a desired center of gravity, wherein the desired center of gravity is based on a desired aircraft maneuver, taking into consideration of a payload of the aircraft which includes the SPP system; and
wherein adjusting the center of gravity to the desired center of gravity improves operational effectiveness of the aircraft.

13. The SPP system of claim 12 wherein the SPP controller automatically controls the SPP propulsion unit to adjust the magnitude and thrust direction based on input from an HIS which determines position of the aircraft to maintain the desired position of the aircraft.

14. The SPP system of claim 12 wherein different desired aircraft maneuvers comprise different desired positions.

15. A method of operating an aircraft comprising:
providing an aircraft with an aircraft propulsion system for propelling the aircraft;
mounting an SPP system onto the aircraft, wherein the SPP system includes
  an SPP propulsion unit, wherein the SPP propulsion unit is independent of the aircraft's propulsion system, the SPP propulsion unit is configured generate thrust in first and second opposite directions, and
  an SPP controller, the SPP controller is configured to control magnitude and direction of thrust of the SPP propulsion unit to adjust a center of gravity of the aircraft to a desired center of gravity, wherein the desired center of gravity is based on a desired aircraft maneuver, taking into consideration of a payload of the aircraft which includes the SPP system; and
operating the aircraft using the aircraft propulsion system, wherein during operation, SPP system is activated to adjust the center of gravity of the aircraft to the desired center of gravity based on the desired aircraft maneuver to improve operational effectiveness of the aircraft.

16. The method of claim 15 wherein the aircraft comprises an HSI to indicate the position of the aircraft.

17. The method of claim 16 wherein the SPP controller automatically controls the SPP propulsion unit to adjust the magnitude and thrust direction based on input from the HSI to maintain the desired position of the aircraft.

18. The method of claim 15 wherein different desired aircraft maneuvers comprise different desired aircraft positions.

19. The method of claim 15 wherein the SPP system comprises:
a rotatable mount for mounting the SPP system to the aircraft, the rotatable mount is configured to rotate around a y-axis which is about perpendicular to a horizontal position of the aircraft, the rotatable mount;
a housing body joint connected to the rotatable mount, the housing body joint is configured to rotate around an x-axis which is about perpendicular to the y-axis;
a housing body connected to the housing body joint, the housing body is configured to contain the SPP propulsion unit; and
wherein the first and second opposite thrust directions are parallel a plane of a base of the housing body.

20. The method of claim 19 wherein the plane of the base of the housing body is about parallel to the y-axis.

* * * * *